US012800042B2

(12) United States Patent
Chuang

(10) Patent No.: US 12,800,042 B2
(45) Date of Patent: Nov. 17, 2026

(54) EASY-TO-OPERATE VALVE CONNECTOR

(71) Applicant: Louis Chuang, Taichung (TW)

(72) Inventor: Louis Chuang, Taichung (TW)

( * ) Notice: Subject to any disclaimer, the term of this patent is extended or adjusted under 35 U.S.C. 154(b) by 0 days.

(21) Appl. No.: 19/172,911

(22) Filed: Apr. 8, 2025

(65) Prior Publication Data

US 2026/0063214 A1 Mar. 5, 2026

(30) Foreign Application Priority Data

Aug. 27, 2024 (TW) ................................ 113132220

(51) Int. Cl.

*F16K 15/06* (2006.01)
*F04B 33/00* (2006.01)
*F16K 15/20* (2006.01)
*F16K 27/02* (2006.01)
*F16K 27/04* (2006.01)

(52) U.S. Cl.

CPC .......... *F16K 15/063* (2013.01); *F04B 33/005* (2013.01); *F16K 15/06* (2013.01); *F16K 15/20* (2013.01); *F16K 15/207* (2013.01); *F16K 27/0209* (2013.01); *F16K 27/041* (2013.01)

(58) Field of Classification Search

CPC ...... F16K 15/207; F16K 15/20; F16K 15/063; F16K 27/041; F16K 27/0209; F04B 33/005

See application file for complete search history.

(56) References Cited

U.S. PATENT DOCUMENTS 5,645,100 A * 7/1997 Chuang ................. F04B 33/005 137/625.5
8,839,809 B1 * 9/2014 Wang .................... F04B 33/005 137/231
11,168,678 B2 11/2021 Wu
2004/0187960 A1 * 9/2004 Kemppainen ......... F04B 33/005 141/383
2006/0222540 A1 10/2006 Chuang

FOREIGN PATENT DOCUMENTS

CN 205578233 U 9/2016
DE 202004012230 U1 * 10/2004 .......... F16K 11/0716
TW I373580 B 10/2012

* cited by examiner

*Primary Examiner* — Atif H Chaudry

(74) *Attorney, Agent, or Firm* — Muncy, Geissler, Olds & Lowe, P.C.

(57) ABSTRACT

An easy-to-operate valve connector includes a housing and a valve sleeve. The housing has a sliding slot extending along an axial direction of an axis and includes a first end, a second end, and a side passage communicating with the sliding slot. A pressure relief portion is disposed between the side passage and the first end. The valve sleeve is slidably positioned within the sliding slot and includes a first sealing portion and a second sealing portion, which maintain contact with the inner periphery of the sliding slot. When in the pressure-retaining position, the pressure relief portion is located on a side of the first sealing portion opposite to the side passage. When in the pressure-relief position, the pressure relief portion moves between the first sealing portion and the side passage, allowing air to be released from the housing to the exterior.

5 Claims, 4 Drawing Sheets

EASY-TO-OPERATE VALVE CONNECTOR

BACKGROUND OF THE INVENTION

The present invention relates to a valve connector and, more particularly, to an easy-to-operate valve connector with efficient air sealing and pressure control functionality.

U.S. Patent Publication No. 2006/0222540 discloses a pump, which a cylinder, a valve connector, a piston, a rod, a ring and a handle. The cylinder includes a first section and a second section. The valve connector is connected to the first section of the cylinder. The piston is positioned movably in the cylinder. The rod is connected to the piston. The ring is fit in the second section of the cylinder and a handle connected to the rod. The handle wraps the second section when the rod is retracted in the cylinder.

However, the aforementioned valve connector of the pump does not include a locking structure that can engage with a valve stem. Instead, it relies solely on a rubber ring at an opening of the valve connector to achieve an airtight seal. Although this design is simpler compared to other common locking structures, such as levers or clamps, achieving an airtight seal requires the rubber ring to be slightly smaller to ensure a tight fit around the exterior of the valve stem. As a result, after inflation is completed, high-pressure air remains inside the valve connector, causing difficulty in removing the valve stem from the valve connector.

In view of the shortcomings of the conventional structure described above, the present inventor has designed an easy-to-operate valve connector capable of overcoming all these disadvantages.

SUMMARY OF THE INVENTION

The present invention provides an easy-to-operate valve connector that enables efficient air pressure control and release. The valve connector includes a housing and a valve sleeve. The housing has a sliding slot extending along an axial direction of an axis, with a first end, a second end, and a side passage communicating with the sliding slot. A pressure relief portion is disposed between the side passage and the first end.

The valve sleeve is slidably disposed within the sliding slot and includes a first sealing portion and a second sealing portion, both maintaining constant contact with the inner periphery of the sliding slot. The second sealing portion is positioned between the side passage and the second end. In a pressure-retaining position, the pressure relief portion is located on a side of the first sealing portion opposite to the side passage. In a pressure-relief position, the pressure relief portion moves between the first sealing portion and the side passage, allowing air to be released from the housing.

In certain embodiments, the pressure relief portion includes a plurality of pressure relief grooves extending from the first end toward the second end. The housing may also include an outer sleeve and a side tube, with the sliding slot disposed within the outer sleeve. The outer sleeve protrudes outwardly to form a tab on a side opposite to the side tube.

Additionally, the sliding slot may penetrate through the outer sleeve, allowing both ends of the valve sleeve to protrude outward from the first and second ends of the sliding slot. The valve sleeve may include a pipe, a sealing ring, a front end cap, and a rear end cap, wherein the pipe's first and second sealing portions provide air-tight contact.

The front end cap and rear end cap are threadedly coupled to the pipe for secure assembly.

Furthermore, an annular protrusion may be provided on the outer periphery of the pipe. In the pressure-retaining position, the annular protrusion abuts the first end while the rear end cap is separated from the second end. In the pressure-relief position, the annular protrusion is separated from the first end, the rear end cap abuts the second end, and the front end cap abuts the annular protrusion.

Through this design, the valve connector ensures a reliable and efficient mechanism for air retention and controlled pressure release.

The present invention will become clearer in light of the following detailed description of illustrative embodiments of this invention described in connection with the drawings.

DETAILED DESCRIPTION OF THE INVENTION

Figure 1:
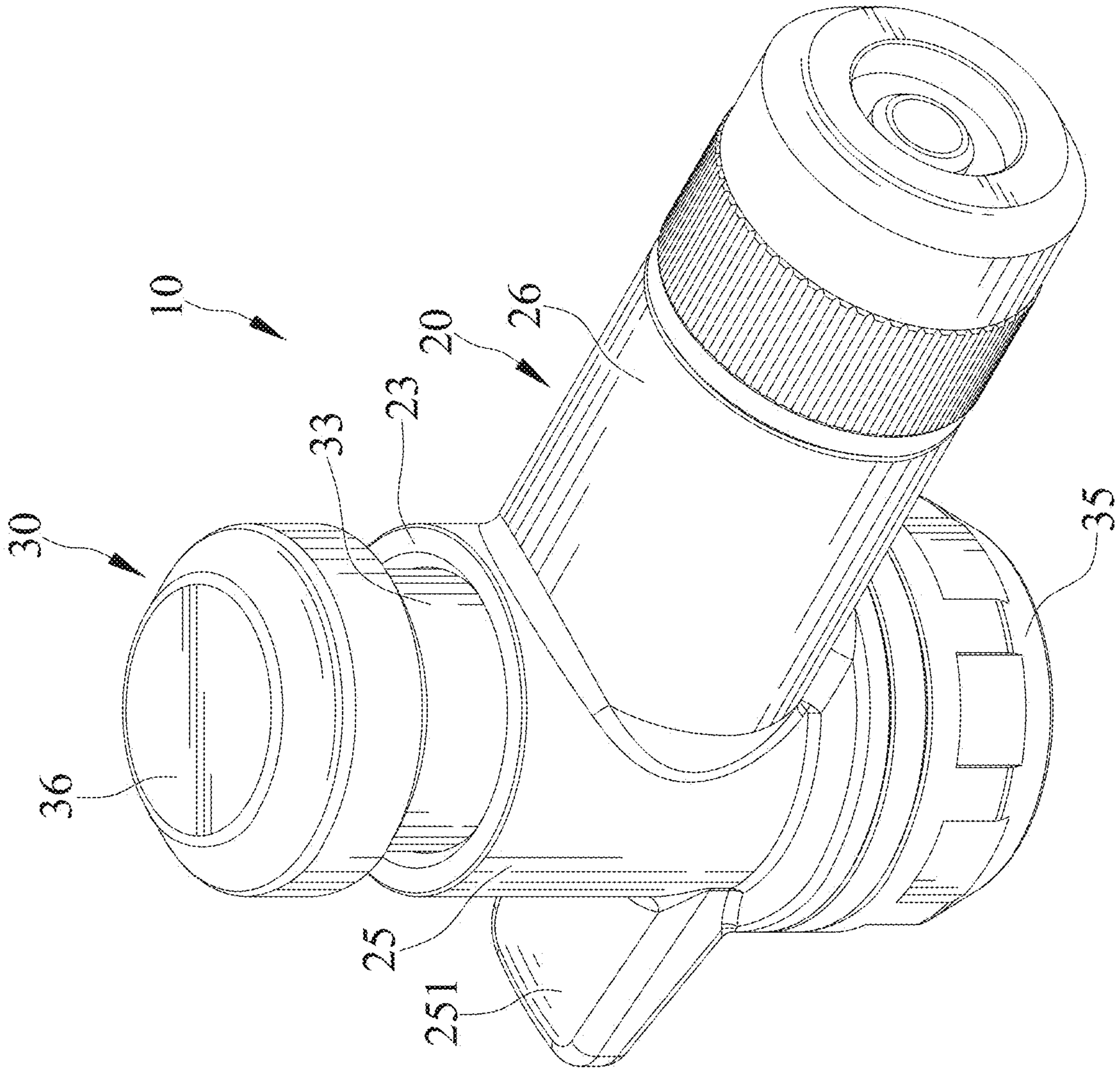
FIG. 1 is a perspective view of a valve connector of an embodiment according to the present invention.
Figure 2:
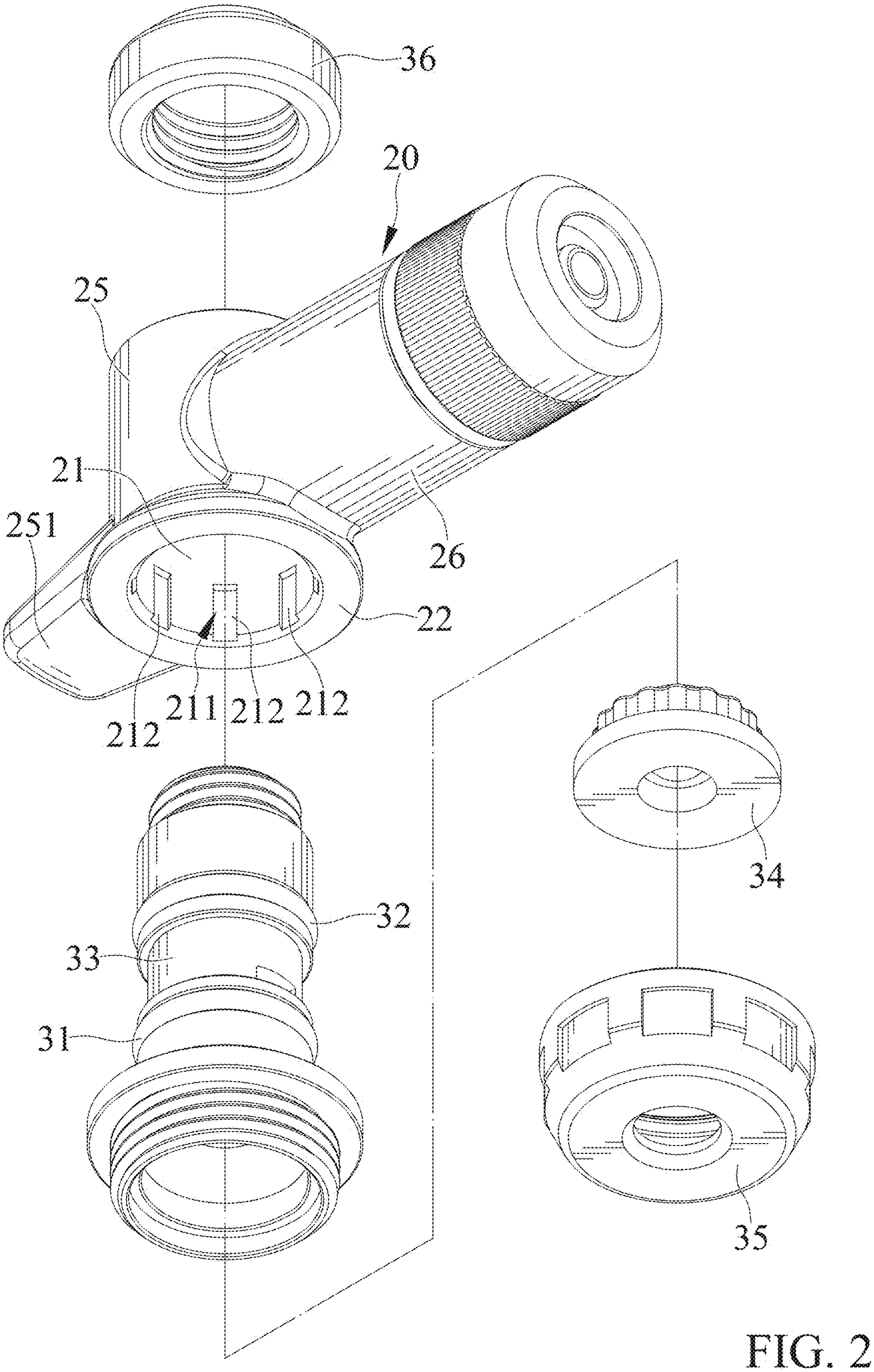
FIG. 2 is an exploded perspective view of the valve connector of FIG. 1.
Figure 3:
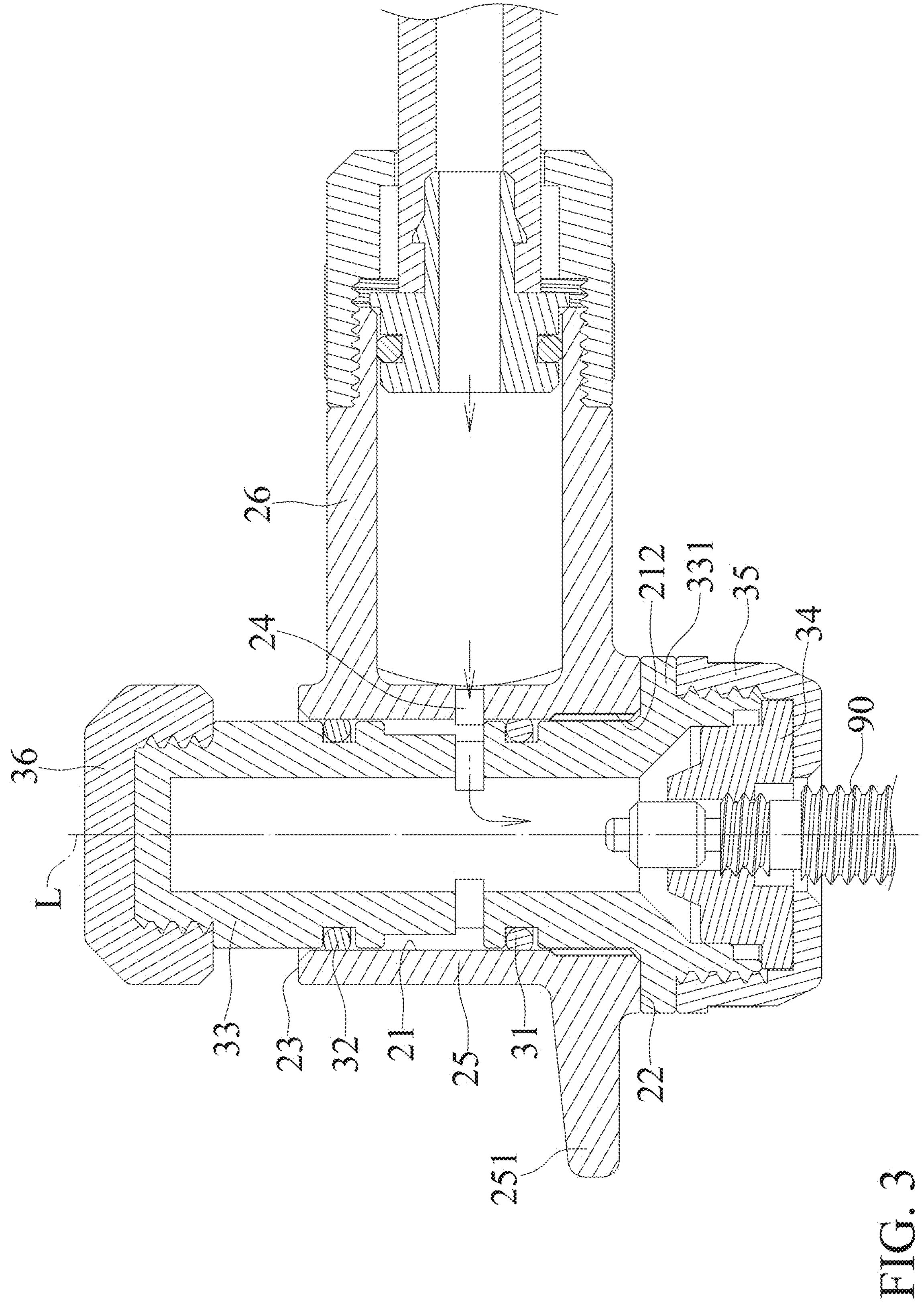
FIG. 3 is a cross sectional view of the valve connector of FIG. 1, and shows the valve sleeve in a pressure-retaining position.
Figure 4:
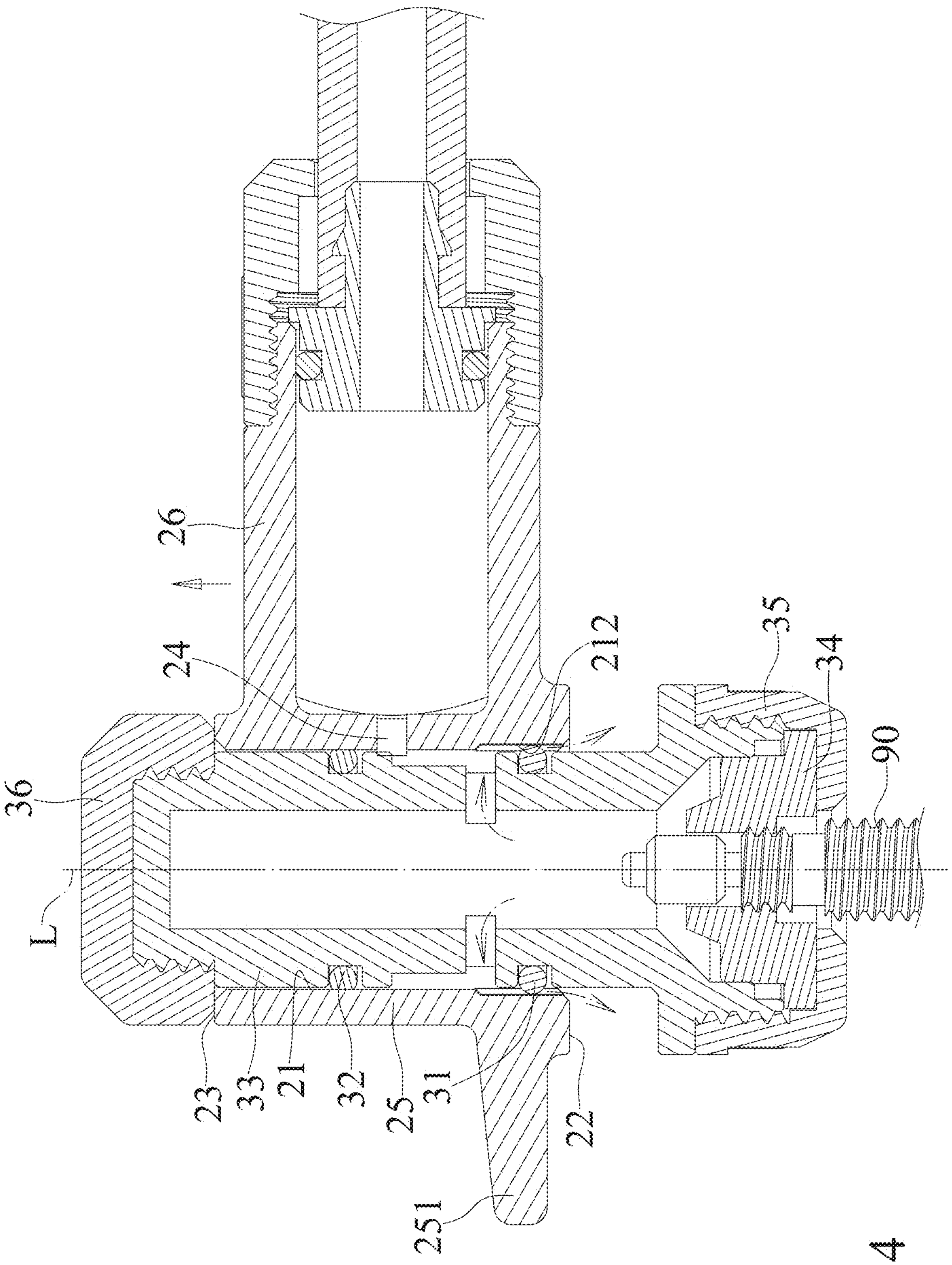
FIG. 4 is another cross sectional view of the valve connector of FIG. 1, and shows the valve sleeve in a pressure-relief position.

FIGS. 1-4 show an easy-to-operate valve connector 10 of an embodiment according to the present invention. The valve connector 10 includes a housing 20 and a valve sleeve 30.

The housing 20 has a sliding slot 21 along an axial direction of an axis L. The housing 20 is provided with a first end 22 and a second end 23 opposite to the first end 22 along the axis L. The housing 20 is further provided with a side passage 24 communicating with the sliding slot 21 along a radial direction of the axis L. An inner periphery of the sliding slot 21 is provided with a pressure relief portion 211, which is disposed between the side passage 24 and the first end 22.

The valve sleeve 30 is slidably disposed within the sliding slot 21 along the axial direction of the axis L between a pressure-retaining position and a pressure-relief position. An outer periphery of the valve sleeve 30 is provided with a first sealing portion 31 and a second sealing portion 32, both of which maintain constant contact with the inner periphery of the sliding slot 21. The second sealing portion 32 is disposed between the side passage 24 and the second end 23. When the valve sleeve 30 is in the pressure-retaining position, the pressure relief portion 211 is moved to a side of the first sealing portion 31 opposite to the side passage 24. When the valve sleeve 30 is in the pressure-relief position, the pressure relief portion 211 is moved between the first sealing portion 31 and the side passage 24, allowing air inside the housing 20 to be released to the exterior of the housing 20 through the pressure relief portion 211.

The pressure relief portion 211 is provided with a plurality of pressure relief grooves 212, each having a proximal end connected to the first end 22 and a terminal end extending in a direction parallel to the axial direction of the axis L toward the second end 23.

The housing 20 is provided with an outer sleeve 25 and a side tube 26 connected to the outer sleeve 25 along the radial direction of the axis L. The sliding slot 21 is disposed within the outer sleeve 25. The first end 22 and the second end 23 are respectively disposed at two opposite ends of the outer sleeve 25. The side passage 24 communicates the sliding slot 21 and an internal space of the side tube 26. The outer sleeve 25 protrudes outwardly to form a tab 251 disposed on a side of the outer sleeve 25 opposite to the side tube 26 along the radial direction of the axis L.

The sliding slot 21 penetrates through the outer sleeve 25 and communicates the first end 22 and the second end 23, and both ends of the valve sleeve 30 respectively protrude outward from the sliding slot 21 via the first end 22 and the second end 23.

The valve sleeve 30 includes a pipe 33, a sealing ring 34, a front end cap 35, and a rear end cap 36. The first sealing portion 31 and the second sealing portion 32 are disposed on an outer periphery of the pipe 33 along the radial direction of the axis L. One end of the pipe 33 protrudes outward from the sliding slot 21 via the first end 22, and the other end protrudes outward from the sliding slot 21 via the second end 23. The sealing ring 34 is connected to the end of the pipe 33 protruding from the first end 22. The front end cap 35 is threadedly coupled to the end of the pipe 33 protruding from the first end 22 and abuts against a side of the sealing ring 34 opposite to the pipe 33. The rear end cap 36 is threadedly coupled to the end of the pipe 33 protruding from the second end 23.

The pipe 33 is provided with an annular protrusion 331 on the outer periphery thereof along the radial direction of the axis L. When the valve sleeve 30 is in the pressure-retaining position, the annular protrusion 331 abuts against the first end 22, and the rear end cap 36 is separated from the second end 23. When the valve sleeve 30 is in the pressure-relief position, the annular protrusion 331 is separated from the first end 22, the rear end cap 36 abuts against the second end 23, and the front end cap 35 abuts against a side of the annular protrusion 331 opposite to the outer sleeve 25.

The valve connector 10 provides convenient operation and excellent airtight performance through the aforementioned structure. When using the valve connector 10, a Presta valve 90 can be directly inserted into the valve sleeve 30, and the sealing ring 34 tightly fits around the outer periphery of the Presta valve 90 to achieve an airtight seal. When the valve sleeve 30 is in the pressure-retaining position, air inside the housing 20 is prevented from being released to the exterior through the pressure relief portion 211, allowing high-pressure air to enter the Presta valve 90. When the valve sleeve 30 is in the pressure-relief position, air inside the housing 20 is released to the exterior through the pressure relief portion 211. After releasing the high-pressure air inside the valve sleeve 30, the sealing ring 34 relaxes, enabling the user to easily remove the Presta valve 90. Switching the position of the valve sleeve 30 only requires a simple pushing action, eliminating the need for complex operations.

Although specific embodiments have been illustrated and described, numerous modifications and variations are still possible without departing from the scope of the invention. The scope of the invention is limited by the accompanying claims.

The invention claimed is:

1. An easy-to-operate valve connector, comprising:

a housing having a sliding slot along an axial direction of an axis, wherein the housing is provided with a first end and a second end opposite to the first end along the axis, wherein the housing is further provided with a side passage communicating with the sliding slot along a radial direction of the axis, and wherein an inner periphery of the sliding slot is provided with a pressure relief portion disposed between the side passage and the first end, wherein the pressure relief portion is provided with a plurality of pressure relief grooves, and wherein each of the plurality of pressure relief grooves has a proximal end connected to the first end and a terminal end extending in a direction parallel to the axial direction of the axis toward the second end; and a valve sleeve slidably disposed within the sliding slot along the axial direction of the axis between a pressure-retaining position and a pressure-relief position, wherein an outer periphery of the valve sleeve is provided with a first sealing portion and a second sealing portion, wherein the first sealing portion and the second sealing portion are in constant contact with the inner periphery of the sliding slot, wherein the second sealing portion is disposed between the side passage and the second end;

wherein when the valve sleeve is in the pressure-retaining position, the pressure relief portion is moved to a side of the first sealing portion opposite to the side passage;

wherein when the valve sleeve is in the pressure-relief position, the pressure relief portion is moved between the first sealing portion and the side passage, allowing air inside the housing to be released to the exterior of the housing through the pressure relief portion.

2. An easy-to-operate valve connector, comprising:

a housing having a sliding slot along an axial direction of an axis, wherein the housing is provided with a first end and a second end opposite to the first end along the axis, wherein the housing is further provided with a side passage communicating with the sliding slot along a radial direction of the axis, and wherein an inner periphery of the sliding slot is provided with a pressure relief portion disposed between the side passage and the first end, wherein the housing is provided with an outer sleeve and a side tube connected to the outer sleeve along the radial direction of the axis, wherein the sliding slot is disposed within the outer sleeve, wherein the first end and the second end are respectively disposed at two opposite ends of the outer sleeve, wherein the side passage communicates the sliding slot and an internal space of the side tube, and wherein the outer sleeve protrudes outwardly to form a tab disposed on a side of the outer sleeve opposite to the side tube along the radial direction of the axis; and a valve sleeve slidably disposed within the sliding slot along the axial direction of the axis between a pressure-retaining position and a pressure-relief position, wherein an outer periphery of the valve sleeve is provided with a first sealing portion and a second sealing portion, wherein the first sealing portion and the second sealing portion are in constant contact with the inner periphery of the sliding slot, wherein the second sealing portion is disposed between the side passage and the second end;

wherein when the valve sleeve is in the pressure-retaining position, the pressure relief portion is moved to a side of the first sealing portion opposite to the side passage;

wherein when the valve sleeve is in the pressure-relief position, the pressure relief portion is moved between the first sealing portion and the side passage, allowing air inside the housing to be released to the exterior of the housing through the pressure relief portion.

3. The easy-to-operate valve connector as claimed in claim 2, wherein the sliding slot penetrates through the outer sleeve and communicates the first end and the second end, and wherein both ends of the valve sleeve respectively protrude outward from the sliding slot via the first end and the second end.

4. The easy-to-operate valve connector as claimed in claim 3, wherein the valve sleeve includes a pipe, a sealing ring, a front end cap, and a rear end cap, wherein the first sealing portion and the second sealing portion are disposed on an outer periphery of the pipe along the radial direction of the axis, wherein one end of the pipe protrudes outward from the sliding slot via the first end, and the other end protrudes outward from the sliding slot via the second end, wherein the sealing ring is connected to the end of the pipe protruding from the first end, wherein the front end cap is threadedly coupled to the end of the pipe protruding from the first end and abuts against a side of the sealing ring opposite to the pipe, and wherein the rear end cap is threadedly coupled to the end of the pipe protruding from the second end.

5. The easy-to-operate valve connector as claimed in claim 4, wherein the pipe is provided with an annular protrusion on the outer periphery thereof along the radial direction of the axis;

wherein when the valve sleeve is in the pressure-retaining position, the annular protrusion abuts against the first end, and the rear end cap is separated from the second end;

wherein when the valve sleeve is in the pressure-relief position, the annular protrusion is separated from the first end, the rear end cap abuts against the second end, and the front end cap abuts against a side of the annular protrusion opposite to the outer sleeve.

* * * * *